July 29, 1958 P. S. MORGAN 2,845,158
CLUTCH FOR HAND TOOL
Filed April 22, 1952 2 Sheets-Sheet 1
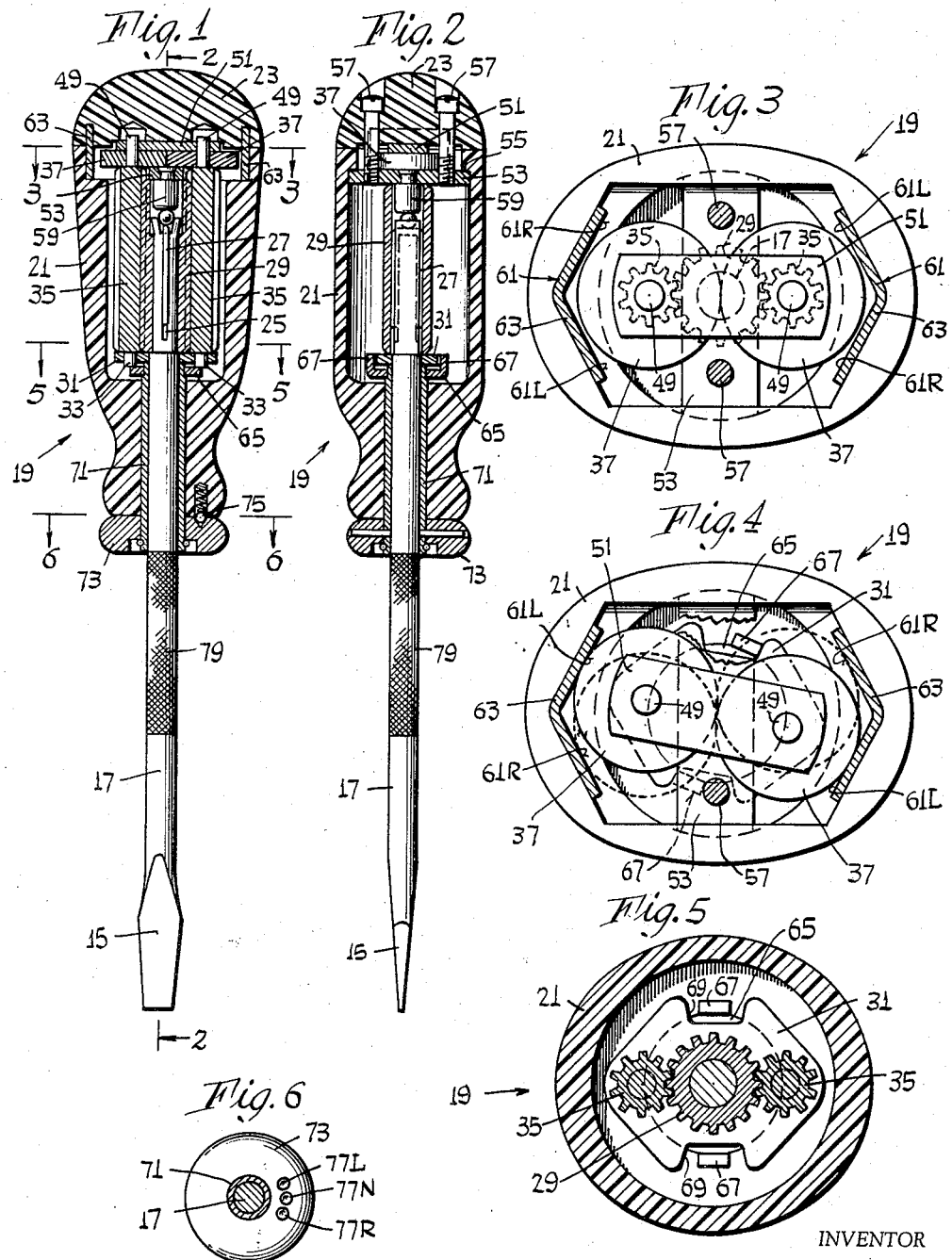
INVENTOR
Porter S. Morgan
BY Johnson and Kline
ATTORNEYS July 29, 1958  P. S. MORGAN  2,845,158
CLUTCH FOR HAND TOOL
Filed April 22, 1952  2 Sheets-Sheet 2
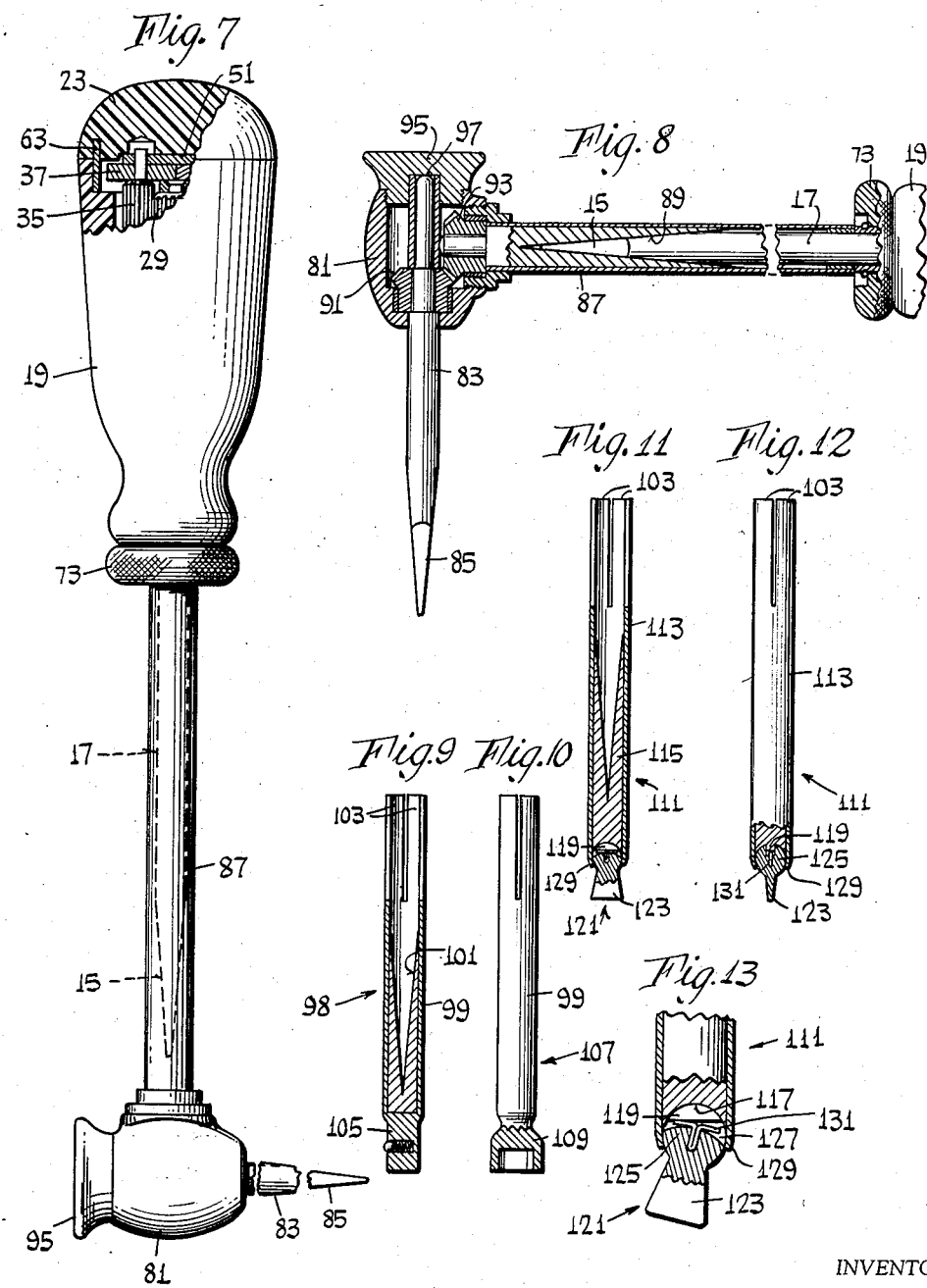
INVENTOR
Porter S. Morgan
BY
Johnson and Kline
ATTORNEYS United States Patent Office 2,845,158
Patented July 29, 1958

2,845,158
CLUTCH FOR HAND TOOL
Porter S. Morgan, Westport, Conn., assignor to I. L. Hartenberg, Fairfield, Conn., as trustee Application April 22, 1952, Serial No. 283,558
10 Claims. (Cl. 192—44)

This invention relates to clutching means for making a driving connection between rotary parts in one direction and permitting free relative rotation therebetween in the other direction, and to hand tools equipped with clutches of this character.

It is an object of the present invention to provide a hand tool with an improved form of one-way drive mechanism for connecting the power handle and the shank, as well as to provide such an improved drive itself for use in any similar adaptation.

It is another object of the invention to provide an improved form of one-way drive in which the direction of drive is readily controllable, and to provide means for selecting the drive direction, or for setting the mechanism to drive in both directions.

Another object of the invention is the provision of a hand tool in which the one-way drive is brought about by means of a friction roller assembly geared to be driven by one of the driving or driven elements and designed for wedging action between braking surfaces on the other element.

A feature of the invention in the foregoing connection is the provision of braking or wedging surfaces on one of the relatively rotatable elements for cooperation with the roller assembly driven by the other, in either direction of rotation, together with a controllable inhibiting means for preventing wedging of the roller assembly in a selected direction to thereby provide a ratcheting action.

Another object of the invention is to provide a hand tool including a one-way drive mechanism which is usable either as an in-line rotary tool or as a crank type tool, and utilizing the same one-way drive mechanism for either adaptation.

A further object of the present invention is to provide a novel construction for interchangeable bits which makes use of the configuration of one of the useful bits as a master driving connection for drivingly connecting the others.

A still further object of the invention is the provision of a novel bit structure in which the work contacting portions have a universal drive connection with the shank to permit use of the tool under cramped or awkward circumstances.

In the drawing:

Figure 1 is a longitudinal section of a screw driver constructed according to the present invention.

Fig. 2 is a section on line 2—2 of Fig. 1.

Fig. 3 is a section on line 3—3 of Fig. 1 and illustrating the position of the parts with the control in neutral setting for driving in both directions.

Fig. 4 is a view similar to Fig. 3 with the parts shown in the positions assumed when the control is in left-hand or anticlockwise drive setting, the dotted circles, however, indicating also the roller positions when the control is in right-hand or clockwise drive position.

Fig. 5 is a section on line 5—5 of Fig. 1.

Fig. 6 is a section on line 6—6 of Fig. 1.

Fig. 7 is a side elevation of a screw driver similar to Fig. 1 illustrating its use in combination with an angle adapter for converting it to a crank type tool.

Fig. 8 is a condensed section of the adapter shown in Fig. 7 and showing the same in the form of a screw driver bit, the screw driver of Fig. 1 being shown in part to illustrate the cooperative relationship between it and the adapter.

Fig. 9 is a longitudinal section of a squared drive adapter for use with either of the screw drivers of Figs. 1 or 8.

Fig. 10 is an elevation, partly in section of a socket adapter for converting the screw driver of Figs. 1 or 8 to a socket wrench.

Fig. 11 is a longitudinal section of an adapter for the screw driver of Figs. 1 or 8, having a special rockable tool tip for use in cramped locations.

Fig. 12 is an elevation of the device of Fig. 11 taken from the right and looking towards the left, the tip portion being partly broken away to illustrate the operation of the parts.

Fig. 13 is an enlarged view of the tip portion of the device shown in Fig. 11, with the tool tip shown in rocked position.

Referring to the drawings there is shown in Figures 1 to 6, a hand tool in the form of a screw driver. The tool bit or screw driver 15 is formed on the end of a shaft 17 which is carried by and rotatable in a driving handle member 19. The handle member 19 includes a hollow housing 21 closed by a cover member 23 which contains the mechanism for providing a driving connection between the handle member 19 and the shaft 17. The shaft 17 has a keyway 25 formed in its upper end, and a key 27 which engages in keyway 25 and a cooperating keyway in a gear 29 connects the latter firmly and non-rotatably with the shaft 17. Within the housing 21 and rotatable on the shaft 17 adjacent the bottom of the gear 29 is a gear supporting and controlling spider 31 which has openings for receiving the lower trunnions 33 of a pair of pinions 35 designed to mesh with the shaft-connected gear 29 in planetary relation thereto. The upper ends of the pinions 35 are each firmly connected to a friction wheel, the disk or roller 37 having a diameter equal to the distance between the axes of the pinions 35, and each is provided with an upwardly extending trunnion 49. As can be seen in Fig. 3, the disks 37 are larger in diameter than the pinions 35 and are arranged to overhang the end of gear 29. A tie plate 51 is provided with a pair of openings designed to receive the trunnions 49, to hold the pinions 35 in mesh with the gear 29 and the edges of the disks 37 in contact with each other. A cross bar 53 extends across the top of the housing 21 between the upper ends of the pinions 35 and rests against downwardly-facing shoulder 55 formed on the interior of the housing 21. Screws 57 passing through suitable openings formed in the cap 23 are threaded into the cross bar 53 and serve to retain the cap in place in the housing and the cross bar 53 against the housing shoulder 55. An antifriction thrust bearing member 59 depends from the cross bar 53 centrally thereof and extends into the upper end of the gear 29 to provide a friction-free thrust engagement between the handle and the upper end of the shaft 17 whenever relative rotation therebetween occurs. In connection with gear 29 and pinions 35 it will be noted further that all are of elongate construction providing extensive areas of contact on the meshing teeth so as to keep the unit pressure low while still using small diameter gears and pinions which can fit readily within a handle of conventional size.

Mounted in the upper portion of the housing 21 are four brake surfaces 61 arranged adjacent the outwardly extending portions of the disks 37 as seen in Figure 3.

The brake surfaces 61 are divided into surfaces 61R and 61L which are formed as portions of individual angularly shaped members 63, suitably mounted in the cap 23 and arranged to depend within the upper portion of the housing 21, each closely adjacent the outer edge of one of the disks 37.

The brake members 63 are so shaped and positioned that the surfaces 61R and 61L are all out of contact with the disks 37 when the latter are centrally positioned as shown in Fig. 3, but so that when the disk assembly swings in either direction the disks 37 come into contact with diagonally opposite surfaces at substantially the same time. Line segments cut off by members 63 on lines passing through the axis about which the disks 37 swing (i. e. the axis of gear 29) become progressively shorter as the angle from the central position increases, so that if the disks are moved away from the central position of Fig. 3, each tends to become wedged between a portion of its respective member 63 and the edge of the other disk, or, in other words, the disk assembly as a whole tends to become wedged between the opposed surfaces 61R or 61L.

In the bottom of the housing 21 is mounted a swingable plate 65 having upstanding fingers 67 which fit loosely in notches 69 formed in the edge of the control spider 31. The plate 65 is connected to and carried at the uppermost end of the tube 71 which surrounds the shaft 17 and is firmly connected at its lower end with a manual control knob 73. The knob 73, tube 71 and plate 65 move as a unit and are adapted to be positioned in three different peripheral positions about the shaft 17. A suitable detent means such as spring-pressed poppet 75 in the handle 19, cooperating with recesses 77N, 77L and 77R in the upper surface of knob 73, is provided for holding the assembly 73, 71, 65 in the desired set position. When the detent occupies recess 77N, the device is in neutral and the fingers 67 are located midway of the notches and out of contact with the edge of spider 31 as seen in Fig. 5. When the detent 75 occupies recess 77L it signifies that the knob 73 has been turned clockwise with respect to the handle 19 to place the fingers 67 in the position illustrated in Fig. 4. This rocks the control spider 31 and with it gears 35, disks 37 and tie plate 51 clockwise so that disks 37 are substantially in contact with their respective brake surfaces 61L. When the detent 75 occupies the recess 77R it signifies that the knob 73 has been turned anticlockwise with respect to the handle 19 to place the fingers 67 in still a third position such that the disks 37 are in the dotted line position of Fig. 4 and substantially in contact with their respective brake surfaces 61R.

The operation of the device of Figs. 1 to 6 will now be described, first in connection with a detent setting in the recess 77L which corresponds to the primary showing in Fig. 4. This is the position used either for driving a screw with a left-hand thread, or for drawing the usual right-hand threaded screw. It will be understood that the bit 15, shaft 17 and gear 29 tend to be held against rotation by the engaged work, while the hand of the operator drives the handle 19 anticlockwise as seen in Fig. 4. For the sake of simplicity this situation can be thought of in terms of a stationary handle 19 and a shaft 17 which is attempting to rotate relatively thereto in a clockwise direction. Such clockwise rotation of shaft 17, if any slight amount should occur, causes clockwise rotation of gear 29 which applies a force to the teeth of pinions 35 in a linear direction tending to wedge each of the disks 37 more tightly between its corresponding brake surface 61L and the edge of the other disk. Such wedging action increases the force of friction enormously and hence prevents the gear 29 from actually rotating the pinions 35, so that the handle 19 and shaft 17 are effectively locked together for producing anticlockwise rotation of the work. In this same situation, if it is now desired to rotate the handle clockwise for ratcheting so as to get into position for another working stroke, the operation will be reversed, and can be most readily understood if the handle 19 is thought of as stationary while the shaft 17 and gear 29 are thought of as attempting to turn counterclockwise within the handle. It will be recalled that the parts are still in the primary position of Fig. 4, and the teeth of gear 29 now exert a force on pinions 35 in a linear direction tending to withdraw each disk 37 from its wedging relationship to the corresponding brake surfaces 61L and the edge of the other disk. The withdrawal is sufficient to substantially reduce the force of friction at the disk periphery, so that the pinions 35 will actually be rotated by the gear 29 and no substantial driving connection between the handle 19 and the shaft 17 exists. The withdrawal of the disk from its wedging condition can be so slight as to be almost imperceptible while still accomplishing its releasing function, and in any case will not be permitted to progress very far, for the fingers 67 at once act as stops against the edges of notches 69 to prevent any further withdrawal of the assembly including spider 31, pinions 35, rollers 37 and tie plate 51.

It will be understood that driving of the work in a right-hand or clockwise direction with a ratcheting action, such as would be used for driving a right-hand screw, or drawing a left-hand screw, can be effected in similar fashion merely by setting the control knob 73 so that the detent 75 engages in the recess 77R. This places the disks 37 in proximity to their respective brake surfaces 61R as seen in dotted lines in Fig. 4. Spider 31 and fingers 67 will then occupy an opposite position to the one shown in this view. The action of the parts is thus reversed so that the disks 37 wedge during clockwise handle rotation to drive the shaft 17 clockwise, and release during anticlockwise rotation to allow the handle 19 to move relative to the shaft 17.

The third condition of use is represented by the neutral setting when the detent 75 engages in the recess 77N of the control knob 73. This disposes the fingers 67 in a central position as seen in Fig. 5 so that no predisposition to a particular wedging direction of the rollers 37 is effected. Consequently the rollers 37 will wedge either against the surfaces 61R or the surfaces 61L depending upon which direction the handle 19 is turned, and the screw driver may be used in the manner of an ordinary screw driver without ratcheting action. Since the disks 37 are not necessarily in rotation inhibiting contact with either of their braking surfaces 61L or 61R at the starting condition of this third phase of the operation, it will be realized that some other effect inhibiting the rotation of pinions 35 about their own axes is present at all times. This is in fact the case in the form shown, for disks 37 are arranged in such a way that their common rotation by gear 29 would cause their rear sides to brush past each other in opposite directions. Since they are in contact, however, the starting friction is sufficient to cause a smart progression of the roller assembly rather than any tendency for the gear 29 to idle between the pinions 35. However, even if this were not the case, sufficient bearing friction at trunnions 33 or 49 would be present or could readily be introduced by springs or the like to achieve the same result.

The foregoing description has been based on the showing in the drawing employing double gears, disks, and braking surfaces to illustrate the preferred form in which the parts are most readily constructed to provide for balanced stresses. It will be understood however, that the invention includes arrangements in which the action is provided by a single disk or roller driven by one of the driving or driven parts of the tool, and cooperating with braking surfaces on the other part which form wedging means for the roller.

In considering the present invention as a screw driver or other hand tool it will be seen that an especially effective and compact arrangement of parts has been invented, for the handle 19 as a whole is caused to depend from its upper portion which is connected to a cross bar 53 by being held against the shoulders 55 by cap retaining screws 57. The cross bar carries the thrust bearing element 59 which provides for pressure against the end of shaft 17 by handle 19 as is necessary in a tool of this type. At the same time the major portion of the mechanism is arranged within the handle below the thrust bearing to avoid excessive over-all length of the tool, and a substantial length of shaft projection into the handle is provided to assure a securely guided relative rotary movement without danger of cocking or misalignment of the parts under pressure.

In Figs. 1 and 2, the shaft 17 is shown as having a knurled area 79 which may be used, for example, in starting a screw. If the screw is in place and the screw driver bit is engaged with the screw head, the screw driver may be held against the screw with one hand to hold the screw in place while the shank 17 and bit 15 are rotated clockwise with the other hand through the first few turns using the knurled area 79 as a grip. It will be understood, of course, that the detent 75 is set in engagement with recess 77R which permits such free clockwise rotation of the shaft 17 within the stationary handle 19. On the other hand similar use may be made of this arrangement for rapidly drawing the screw once it is loosened by merely making the 77L setting of knob 73, and spinning the shaft 17 by means of knurled portion 79.

While the invention has been thus far described in connection with a screw driver bit of conventional configuration, it will be understood that bits of various sorts may be substituted whenever rotary motion is the object, for example, Phillips head screw driver bits, socket wrenches and the like.

Figs. 7 and 8 illustrate novel means by which the ratcheting screw driver of this invention may be converted to an angular or crank type of tool which also has ratcheting properties when desired, and which may also be used in locations where the head room over a screw is insufficient for a normal length screw driver, and further in places where the side room seriously restricts the chance for swinging a crank arm. A hollow body 81 has rotatably mounted within it a shaft 83 one end of which constitutes a tool bit shown in Fig. 8 as a screw driver bit 85. Extending from the body at right angles to the shaft 83 is another rotatably mounted shaft 87 which is hollow and provides a non-circular socket 89 shaped for driving connection with the screw driver bit 15 and having a friction fit on shaft 17 of the device of Figs. 1 to 6. The shafts 83 and 87 are drivingly connected within the housing 81 by a pair of bevel gears 91 and 93 which are connected to the shafts 83 and 87 respectively. A cap 95 on the housing 81 includes thrust bearing means 97 for engagement with the inner end of the shaft 83, and has exterior configuration suited to manual engagement by the operator's hand for forcing the bit 85 into place.

In using the device of Figs. 7 and 8, the bit 85 is engaged with the work and then may be caused to rotate in one of two ways. In the first place, if it is desired to start the screw rapidly or to withdraw it rapidly after being loosened, or if there is insufficient side room to permit free swinging of the shaft 87 and handle 19 about the axis of shaft 83, the handle 19 may be rotated about its own axis to drive the bit 85 through bevel gears 91, 93 and thus advance or withdraw the screw. This rotation of the handle 19 about its axis may also be made to include the ratcheting effect previously described if desired by merely setting the knob 73 in the positions previously indicated. On the other hand, the device of Figs. 7 and 8 may be used as a crank or lever tool if desired, e. g. for final tightening or initial loosening of a screw. In this case the handle 19 is swung around the axis of shaft 83 in the desired direction without rotating the handle 19 on its own axis, the handle being tightly gripped and held against rotation by the operator. Assuming that control knob 73 is in neutral position, no substantial relative rotation between shaft 17 and handle 19 will be permitted in either direction. Consequently bevel gears 91 and 93 will undergo no significant rotation about their axes, and the bit 85 will be in effect locked to the body 81 to rotate with the same in both directions. If a ratcheting operation is desired, this may also be obtained by setting the knob 73 so that detent 75 (Fig. 1) is engaged in recess 77R for tightening a right-hand screw or in recess 77L for loosening a right-hand screw. Then when the shaft 87 is swung back in the non-driving direction, it will do so freely with no substantial tendency to rotate either the shaft 83 or the handle 19 about their own axes. Although such swinging actually rotates shaft 17 due to the movement of gear 93 on gear 91, this motion is not communicated to the handle 19, because the same is disconnected from the shaft in the manner described in relation to Figs. 1 to 6.

Figs. 9 to 13 illustrate various novel forms of adapters which may be applied to the bit 15 of Figs. 1 and 12 or the bit 85 of Fig. 8 in order to convert the tool to other uses. Fig. 9, for example shows an attachment 98 including a hollow member 99 providing a non-circular socket 101 shaped to fit the bit 15 or 85 and to form a driving connection therewith. Spring fingers 103 are provided at the socket opening for frictionally gripping the shaft 17 or 83 to hold the attachment firmly in place against inadvertent loss. The end of member 99 opposite fingers 103 carries the work engaging element, in this case a squared connector 105 for use with any tool bits having cooperating squared openings, for example a set of socket wrenches in graduated sizes.

Fig. 10 is identical with Fig. 9 except in the details of the work engaging portion and the same reference characters have been used to indicate the same parts in each view. Fig. 10 illustrates the use of the hollow member 99 to carry a socket wrench bit 109, the whole assembly being indicated by the reference character 107.

In Figs. 11 to 13 is shown an adapter 111 made up of a hollow sleeve 113 and an insert 115 firmly connected together. The sleeve has spring fingers 103 formed at one end and the insert has a non-circular socket 101 for drivingly receiving a screw driver bit opening towards the split finger end of the sleeve. The opposite end of the insert 115 is formed with a generally hemispherical recess 117 but having a shallow rib 119 extending thereinto on a diametral plane which contains the axis of the sleeve 113. A tip 121 in the form of a screw driver bit 123 having a slotted spherical connector portion 125 integral therewith is engaged in the recess 117. The sphere 125 is of a size to fit into and rock smoothly against the walls of the recess 117, and the slot 127 thereof receives the rib 119 to form a driving connection between the insert 115 and the bit 123. As can be seen in Fig. 13, the slot 127 is more extensive than the web, being much deeper than the web at its ends when the bit 123 is centered, so that substantial rocking of the tip 121 is permitted. The end of the sleeve 113 projects slightly beyond the equator of the sphere 125 and is spun over as indicated by reference numeral 129 to retain the sphere in the recess 117. A leaf spring member 131 anchored in the sphere 125 and lying in contact with the edge of the rib 119 tends to hold the screw driver bit centered to simplify the making of initial contact with the screw.

In use the bit 123 is engaged with a screw which may be intended to be rotated about an axis at an angle to that of the screw driver adapter 111. When the adapter 111 is rotated about its own axis, however, the tip 121 will rock back and forth in the socket 117 in the manner of a universal joint to accommodate the changing angles, the drive to the screw however, always being transmitted by means of the web 119 and the cooperating slot 127.

Variations and modifications may be made within the scope of the claims and portions of the improvements may be used without others.

I claim:

1. In a clutching device, a rotatable shaft; a roller assembly including at least one friction roller in a planetary relation to the shaft and geared to the shaft for rotation about its own axis by the shaft when revolution about the shaft is prevented, and for bodily revolution about the shaft axis by the shaft when roller rotation is inhibited; a rotor rotatable on the same axis as said shaft; and oppositely facing pairs of wedging surfaces carried by said rotor in the revolution path in either direction of movement of said roller assembly for wedging said roller assembly against roller rotation when revolved relative to said rotor into frictional relationship with said surfaces under the influence of the shaft gearing to lock said shaft and rotor together for rotary driving of one by the other; and manually settable means carried by the motor for preventing wedging contact between the roller assembly and either one of the wedging surface pairs, said means also being settable in an intermediate inoperative position where both pairs of wedging surfaces can engage the roller assembly for driving connection between the shaft and rotor in both directions of relative rotation.

2. A hand tool comprising a shaft; a hollow drive handle surrounding and rotatable on one end of the shaft, said handle having separable parts enclosing its interior; a gear fixed on the shaft within the handle; a pinion meshing with said gear and revoluble therearound; means for retaining the gear and pinion in mesh regardless of the revolved position of the pinion about the shaft; a friction roller carried by the pinion at one end thereof and overlying a portion of the end of the shaft carried gear; means providing friction tending to inhibit rotation of said roller about its axis; and means providing a braking surface on said handle in position for wedging engagement with said roller when driven thereagainst by said gear, one of said handle parts being removable from the remainder of the handle to provide access to the interior, without disturbing said gear, pinion, retaining means, friction roller and braking surface.

3. A hand tool comprising a shaft; a hollow drive handle surrounding and rotatable on one end of the shaft, said handle having separable parts enclosing its interior; a gear fixed on the shaft within the handle; a pinion meshing with said gear and revoluble therearound; means for retaining the gear and pinion in mesh regardless of the revolved position of the pinion about the shaft; a friction roller larger than the pinion carried by the pinion at one end thereof and overlying a portion of the end of the shaft carried gear; means providing friction tending to inhibit rotation of said roller about its axis; means providing braking surfaces on said handle at either side of said roller in positions for wedging engagement with said roller when driven thereagainst by said gear; and a control element movably carried on said handle and positionable so as to prevent wedging of said roller against a selected one of said surfaces, one of said handle parts being removable from the remainder of the handle to provide access to the interior, without disturbing said gear, pinion, retaining means, friction roller and braking surface.

4. A hand tool comprising a shaft; a hollow drive handle surrounding and rotatable on one end of the shaft, said handle having separable parts enclosing its interior; a gear fixed on the shaft within the handle; two pinions meshing with said gear and revoluble therearound; means for retaining the gear and pinions in mesh regardless of the revolved position of the pinions about the shaft and for maintaining the pinions in relatively fixed radial positions about the shaft axis; friction rollers carried by the pinions at their ends, each overlying a portion of the end of the shaft carried gear and being in contact with the other roller; and means providing a pair of braking surfaces on said handle in position for wedging said rollers between them when the rollers are revolved thereagainst by said gear, one of said handle parts being removable from the remainder of the handle to provide access to the interior, without disturbing said gear, pinions, retaining means, friction rollers and braking surface.

5. A hand tool comprising a shaft; a hollow drive handle surrounding and rotatable on one end of the shaft, said handle having separable parts enclosing its interior; a gear fixed on the shaft within the handle; two pinions meshing with said gear and revoluble therearound; means for retaining the gear and pinion in mesh regardless of the revolved position of the pinions about the shaft and for maintaining the pinions in relatively fixed radial positions about the shaft axis; friction rollers carried by the pinions at their ends, each overlying a portion of the end of the shaft carried gear and being in contact with the other roller; means providing two pairs of braking surfaces on said handle in opposite directions of revolution of said rollers and in the revolution path thereof in position for wedging engagement with said rollers when the latter are revolved thereagainst by said gear; and a control element movably carried on said handle and positionable so as to prevent wedging of said rollers against a selected pair of said surfaces, one of said handle parts being removable from the remainder of the handle to provide access to the interior, without disturbing said gear, pinions, retaining means, friction rollers and braking surface.

6. A hand tool comprising a shaft; a hollow drive handle surrounding and rotatable on one end of the shaft, said handle having separable parts enclosing its interior; a gear fixed on the shaft within the handle; two pinions meshing with said gear and revoluble therearound; means for retaining the gear and pinions in mesh regardless of the revolved position of the pinions about the shaft and for maintaining the pinions in relatively fixed radial positions about the shaft axis; friction rollers carried by the pinions at their ends, each overlying a portion of the end of the shaft carried gear and being in contact with the other roller; means providing a pair of braking surfaces on said handle in position for wedging said rollers between them when the rollers are revolved thereagainst by said gear; a cross bar supporting said handle extending between said rollers and the end of said shaft; and a thrust bearing between said cross bar and the end of said shaft, one of said handle parts being removable from the remainder of the handle to provide access to the interior, without disturbing said gear, pinions, retaining means, friction rollers and braking surface.

7. In a clutching device, a rotatable shaft; a roller assembly including at least one friction roller disposed in a planetary relation to the shaft and geared to the shaft for rotation about its own axis in response to turning of the shaft when movement of the roller about the shaft axis is prevented, and for bodily movement concentric with the shaft axis in response to turning of the shaft when roller rotation about its axis is prevented; a rotor rotatable on the same axis as and with respect to said shaft; and wedging surfaces fixedly carried by said rotor and inclined to and disposed in the path of movement of said roller for wedging said roller against turning about its axis when the roller is moved relative to said rotor into frictional engagement with said surfaces under force exerted by the shaft gearing, thereby to lock said shaft and rotor together for rotary driving of one by the other.

8. In a clutching device, a rotatable shaft; a roller assembly including at least one friction roller disposed in a planetary relation to the shaft and geared to the shaft for rotation about its own axis in response to turning of the shaft when movement of the roller about the shaft axis is prevented, and for bodily movement concentric with the shaft axis in response to turning of the shaft when roller rotation about its axis is prevented; a rotor rotatable on the same axis as and with respect to said shaft; wedging surfaces fixedly carried by said rotor in the path of movement of said roller when the roller is moved in one direction relative to the rotor for wedging said roller against turning about its axis when the roller is moved relative to said rotor into frictional engagement with said surfaces under force exerted by the shaft gearing to lock said shaft and rotor together for rotary driving of one by the other; and means carried by said rotor to arrest movement in the other direction of said roller relative to the rotor without wedging of the roller against rotation, thereby to cause the roller to rotate idly under force imparted by the shaft gearing and permit relative rotation of said shaft and rotor in said other direction.

9. In a clutching device, a rotatable shaft; a roller assembly including two contacting friction rollers in planetary relation to the shaft, both said rollers being geared to the shaft for rotation about their own axes in response to turning of the shaft when movement of the roller about the shaft is prevented, and for bodily movement concentric with the shaft axis in response to turning of the shaft when roller rotation about its axis is prevented; a rotor rotatable on the same axis as and with respect to said shaft; and wedging surfaces fixedly carried by said rotor and inclined to and disposed in the path of movement of said rollers for wedging the same against rotation when moved relative to said rotor into frictional engagement with said surfaces under force exerted by the shaft gearing, thereby to lock said shaft and rotor together for rotary driving of one by the other.

10. In a clutching device, a rotatable shaft; a roller assembly including two contacting friction rollers in planetary relation to the shaft, both said rollers being geared to the shaft for rotation about their own axes in response to turning of the shaft when movement of the roller about the shaft is prevented, and for bodily movement concentric with the shaft axis in response to turning of the shaft when roller rotation about its axis is prevented; a rotor rotatable on the same axis as and with respect to said shaft; and a pair of wedging surfaces fixed on said rotor, having portions slightly nearer to each other than the sum of the diameters of said contacting rollers and positioned for simultaneous engagement each by one of said rollers when the latter are moved relative to the rotor under force imparted by the shaft gearing, thereby to wedge each roller between its contacting wedging surface and the other roller and thus lock said shaft and rotor together for rotary driving of one by the other.

References Cited in the file of this patent

UNITED STATES PATENTS

| | | |
|---|---|---|
| 388,233 | Wehner | Aug. 21, 1888 |
| 519,962 | Mallock | May 15, 1894 |
| 1,199,823 | Sadtler | Oct. 3, 1916 |
| 1,230,173 | Kremer | June 19, 1917 |
| 1,573,464 | Topping | Feb. 16, 1926 |
| 1,878,053 | Winger | Sept. 20, 1932 |
| 2,089,121 | Hartung | Aug. 3, 1937 |
| 2,108,344 | Miller | Feb. 15, 1938 |
| 2,225,278 | Robin et al. | Dec. 17, 1940 |
| 2,253,168 | Burbridge | Aug. 19, 1941 |
| 2,522,966 | Cone | Sept. 19, 1950 |
| 2,594,669 | Marshall | Apr. 29, 1952 |